US008862125B2

(12) United States Patent
Leguay et al.

(10) Patent No.: US 8,862,125 B2
(45) Date of Patent: Oct. 14, 2014

(54) METHOD AND SYSTEM FOR DISTRIBUTING CONTENT WITH GUARANTEES OF DELIVERY TIMESCALES IN HYBRID RADIO NETWORKS

(75) Inventors: Jérémie Leguay, Colombes (FR); Vania Conan, Colombes (FR); John Whitbeck, Paris (FR)

(73) Assignee: Thales, Neuilly sur Seine (FR)

( * ) Notice: Subject to any disclaimer, the term of this patent is extended or adjusted under 35 U.S.C. 154(b) by 394 days.

(21) Appl. No.: 13/510,309

(22) PCT Filed: Nov. 10, 2010

(86) PCT No.: PCT/EP2010/067202
§ 371 (c)(1),
(2), (4) Date: Sep. 4, 2012

(87) PCT Pub. No.: WO2011/061105
PCT Pub. Date: May 26, 2011

(65) Prior Publication Data
US 2013/0130615 A1 May 23, 2013

(30) Foreign Application Priority Data

Nov. 17, 2009 (FR) ...................................... 09 05518

(51) Int. Cl.
H04W 4/00 (2009.01)
H04W 4/12 (2009.01)
H04W 4/06 (2009.01)
H04L 12/18 (2006.01)
H04W 84/22 (2009.01)

(52) U.S. Cl.
CPC ................ *H04W 4/06* (2013.01); *H04W 84/22* (2013.01); *H04W 4/12* (2013.01); *H04L 12/1845* (2013.01); *H04L 12/1854* (2013.01); *H04L 12/189* (2013.01); *H04L 12/1881* (2013.01)
USPC .................. 455/432.3; 455/456.3; 455/414.3; 709/203; 709/217; 709/219; 709/226

(58) Field of Classification Search
USPC ........ 455/456.2, 456.3, 408, 410, 411, 414.1, 455/414.3, 422.13, 432.3; 709/203, 217, 709/219, 226; 370/235
See application file for complete search history.

(56) References Cited

U.S. PATENT DOCUMENTS 8,355,667 B2 * 1/2013 Witzman ...................... 455/3.06
2003/0046376 A1 * 3/2003 Yen et al. ...................... 709/220
(Continued)

FOREIGN PATENT DOCUMENTS

EP 1133116 A2 9/2001
WO 03/105353 A2 12/2003

OTHER PUBLICATIONS

Ioannidis S. et al.: "Optimal and Scalable Distribution of Content Updates over a Mobile Social Network," INFOCOM 2009. The 28th Conference on Computer Communications. IEEE, IEEE, Piscataway, NJ, USA, Apr. 19, 2009, pp. 1422-1430.

*Primary Examiner* — Dominic E Rego
(74) *Attorney, Agent, or Firm* — Baker Hostetler LLP

(57) ABSTRACT

Method for disseminating messages or information content in a hybrid network including a network scaffold comprising pilot entities, and a mobile network including mobile nodes communicating in an "ad hoc" manner with one another, the method including: at the level of each of the pilot entities of the scaffold of the network, scheduling the transfers of at least one message by: let $S_C(t)$ be the set of mobile nodes that have subscribed to the content of type C, let Mi be a message corresponding to the content of type C, for each message Mi, if a mobile user node Ui is present in the neighborhood of a pilot entity, then if Ui is subscribed to the content of type Mi, transfer the message Mi to the mobile user Ui, execute a control loop to disseminate the messages to all the mobile nodes that have subscribed to the receipt of a content Mi as a function of the progress of this dissemination so as to comply with timescales required for the distribution of said message.

8 Claims, 4 Drawing Sheets

(56) References Cited

U.S. PATENT DOCUMENTS

| | | | |
|---|---|---|---|
| 2005/0288939 A1* | 12/2005 | Peled et al. | 705/1 |
| 2006/0221891 A1 | 10/2006 | Schmitz et al. | |
| 2007/0168228 A1* | 7/2007 | Lawless | 705/2 |
| 2007/0219844 A1* | 9/2007 | Santorine et al. | 705/9 |
| 2009/0117925 A1* | 5/2009 | De Bonis et al. | 455/466 |
| 2009/0182821 A1* | 7/2009 | Allen et al. | 709/206 |
| 2009/0287837 A1* | 11/2009 | Felsher | 709/229 |
| 2010/0223314 A1* | 9/2010 | Gadel et al. | 709/200 |
| 2011/0066841 A1* | 3/2011 | Goodrow et al. | 713/150 |

* cited by examiner

Scenario 1

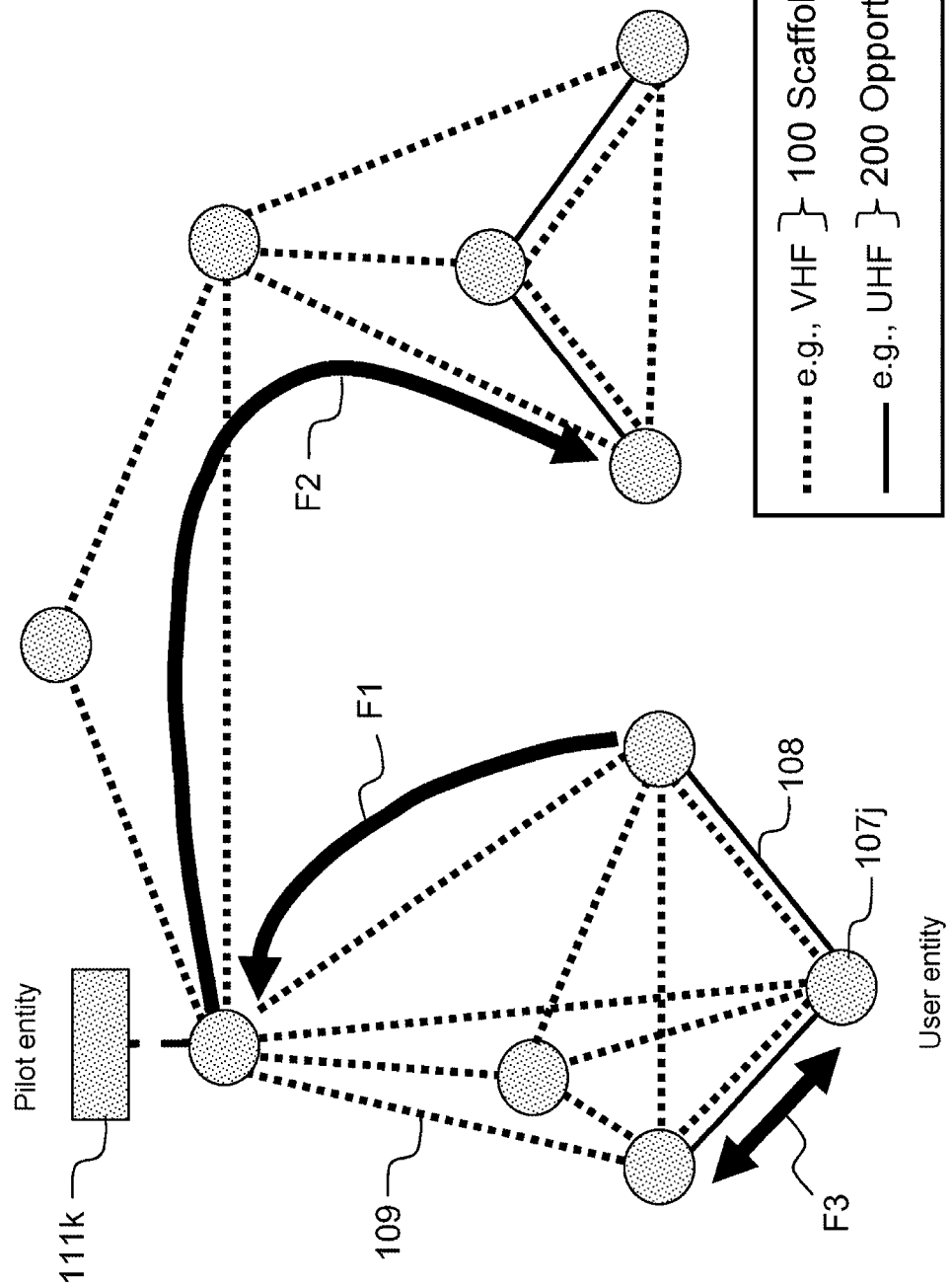

METHOD AND SYSTEM FOR DISTRIBUTING CONTENT WITH GUARANTEES OF DELIVERY TIMESCALES IN HYBRID RADIO NETWORKS

CROSS-REFERENCE TO RELATED APPLICATIONS

This application is a National Stage of International patent application PCT/EP2010/067202, filed on Nov. 10, 2010, which claims priority to foreign French patent application No. FR 09 05518, filed on Nov. 17, 2009, the disclosures of each of which are incorporated by reference in their entireties.

FIELD OF THE DISCLOSED SUBJECT MATTER

The subject of the present invention relates to the distributing of data or distributing of contents while complying with timescale constraints in a hybrid radio communications network characterized by the presence of at least two radio communications channels with different characteristics. Typically, one will be omnipresent, and optionally low bitrate, while the other will be less frequently available, but offering higher bitrates, the value of the ratio of the low bitrate and of the higher bitrate being for example 10.

A "low bitrate" corresponds for example to about 100 kB/s and the "higher bitrates" to about 1 Mbit/s.

The method according to the invention applies for example:

Scenario 1 represented in FIG. 1a: In a network consisting of mobile apparatuses (e.g. portable telephones) or user entities $101i$ able to communicate with one another directly through the ad hoc Bluetooth or WiFi system (link 104) represented by solid lines and the arrow F3 and of fixed relay antennas which may be base stations ($102j$) or other mobile entities which communicate with one another according to the arrow F3 on a network of infrastructure of GSM (Global System Mobile) type or WiFi infrastructure (wireless computerized network technology put in place to operate as an internal network). The scaffold 100 of the system is composed for example of an Ethernet, FH or Giga wireless network to which pilot entities ($103k$) and base stations are linked. The communication between the user entities and the pilot entities is done by way of the base stations $102j$ according to the arrow F1 or F2 and by UMTS or GPRS links (105). A base station communicates with a pilot entity via Ethernet, FH or else Giga wireless links (106). The opportunistic domain 200 consists notably of base stations and user entities that communicate with one another via the link 104.

Scenario 2 represented in FIG. 1b: In an entirely mobile network, whose nodes $107i$ possess a short-range but high-bitrate UHF (abbreviation of Ultra High Frequency) radio (link 108), and/or a long-range but low-bitrate VHF (abbreviation of Very High Frequency) radio (link 109). The mobile nodes $107i$ communicate with one another (arrow F3) and by virtue of VHF (arrow F1), by UHF if the nodes are in radio range (arrow F2) or by a combination of the two (arrow F3). The pilot entities $111k$ may be situated on any entity of the network. The opportunistic domain 200 consists in this case of the mobile user entities which communicate with one another for example via UHF links.

In the examples which will be given, the word "scaffold" designates a network of GSM or 3G infrastructure or as a network of mobile nodes which are equipped with radio of ad hoc type using VHF technologies.

The word "opportunistic" designates the set of communication opportunities created as dictated by the mobility of the mobile nodes $Uj$ when they are in radio range: typically Wi-Fi of ad hoc type for the exemplary scenario (1) and UHF communication of ad hoc type for scenario (2).

In the remainder of the description illustrating the invention, a distinction will be made between on the one hand the "scaffold" of the network, consisting of fixed and/or mobile entities offering omnipresent network access, at rather low bitrate and optionally connected to a wire-based network (e.g. Internet), and on the other hand the "opportunistic" domain of the network, frequently disconnected, consisting of the entities whose mobility generates opportunities for high-bitrate communications.

These two networks are geographically superimposed and the "opportunistic" entities are capable of using the omnipresent network offered by the scaffold of the network. This access to the scaffold of the network is effected either by a radio frequency communication (e.g. GSM or WiFi), or else directly when an entity is both opportunistic and integrated into the scaffold of the network (e.g. when both UHF and VHF radios are on board each entity).

Among the various entities of the network, the entities which subscribe and/or produce content will be dubbed "users", and those which aggregate the subscriptions and the offers of contents whose broadcasting they control will be dubbed "pilots". One and the same entity can also be both "user" and "pilot".

The users of the network may be classified along several lines:

Role: a distinction is made between "editors", who publish content, and "subscribers", who subscribe to a content. One and the same user may be both "editor" and "subscriber".

Mobility: loosely speaking, a distinction will be made between "mobile" users, present on the opportunistic network and capable of connecting to the scaffold of the network, and "fixed" users, present solely in the scaffold.

Moreover, the word "content" or the expression "information content" is defined to cover a set of data or information which must be available for a user who has subscribed to a service.

The expressions "mobile node" or "mobile entity" designate one and the same object.

BACKGROUND

In an ad hoc network, each entity or node of the network will communicate directly with its neighbors without passing through an infrastructure. If the destination is not in radio range of the source, the latter can pass its data through a string of other entities which will be responsible for forwarding them by virtue of a routing protocol embedded in each entity.

Networks comprising mobile entities communicating with fixed entities situated in the infrastructure are in general lower bitrate than ad hoc links but they benefit from a longer radio range. The capabilities for communication between the infrastructure and the mobile entities are very often critical and expensive resources (expensive for example as regards the quality of the global service which is manifested through a bandwidth requirement). When it is desired to transfer content to a large number of mobile entities, the network is then at risk of collapsing or the proposed service of becoming too expensive.

In the case of general-public telecommunications networks, the mobile entities, namely portable telephones, are endowed with connectivity to one or more networks of 3G (mobile telephone standard) and/or Wi-Fi infrastructure for example, and are also endowed with capabilities for ad hoc communication towards the other mobile entities (Bluetooth and/or Wi-Fi in ad hoc mode). The fixed entities, representing content providers for example, may be servers situated in the core of the Internet. In the terminology used in the present invention, the mobile entities are mobile users, while the content providers are both fixed users and pilots. The relay antennas and the routers of the operator network constitute the network scaffold.

In these hybrid networks, content can then be exchanged as is illustrated in FIG. 1a or in FIG. 1b from the pilot entities to the user entities or from the users to the pilot entities, see the arrows referenced F1 and F2, and between the user entities themselves, according to the arrow referenced F3. More precisely:

The arrow F1 corresponds to the dispatching of a content by a pilot entity 103k into the Internet, for example, to the user entities 101i. The transmission of the content that is to be distributed to a user who has subscribed to a service may be relayed from one user to another.

The arrow F2 corresponds to the dispatching of a mobile user entity 101i content to a pilot entity 103k.

The arrow F3 is the exchange (the dispatching or the receipt of a content) between the mobile users 101i.

Numerous communication paradigms or models may be put in place for these information exchanges, such as for example: the client-server model in which the fixed users host the content on servers to which the mobile users can connect so as to recover the content of interest to them. The mobile users search among the list of the contents available on the servers for those which interest them; the publication/subscription model known to the person skilled in the art consists of an asynchronous messaging where the senders (editors) of messages do not dispatch their messages to specific or subscriber receivers. Instead of this, the published messages are identified by classes. The subscribers express their interest in respect of the classes of messages that they wish to receive, without knowing, a priori, the published classes. This decoupling between the editors and the subscribers allows scaling and makes it possible to manage large dynamic swings in the network topology. The example chosen to illustrate the method according to the invention will be given within the framework of a publication/subscription model.

The users who have "subscribed" to a series of contents, or of information, in the manner of a subscription to an RSS stream (RSS designates a family of XML formats used for Web content syndication) may have reception timescale constraints. By way of example, people who have subscribed to the PDF (Portable Document Format) daily versions of a newspaper (for example, the New York Times) the information of which is relevant only on the day of publication, desire to receive the daily version before midday each day. These reception timescale constraints may be relaxed for other types of content, such as music titles (for example an MP3 file) of a given artist, or video documentaries (for example the history of France or other subjects).

The target services in respect of which the method and the system according to the invention may be applied are, for example, on-demand content services, by analogy with on-demand television (VoD, abbreviation of Video on Demand). These contents may be for example: software updates, videos (episodes of a TV series, documentaries), a newspaper in electronic version or publications of a blog.

In this context, the reduced number of communication channels between editors and subscribers prohibits the use of approaches such as multicast broadcasting (procedure for broadcasting information from a sender (single source) to a group (several supports/media). The massive distribution of one and the same content originating from a service provider/host and destined for mobile users is usually performed by broadcasting the content successively to each of the interested users. This poses problems of network scaffold loading, notably. The method of multicast type does not therefore allow massive distribution of content destined for mobile users while guaranteeing that the information content awaited by a user will arrive in a given timescale while minimizing the load on the network scaffold.

The publication/subscription model makes it possible to put data producers and consumers in touch, while minimizing exchanges through subscription and stream management mechanisms.

In most cases of use, the publication/subscription model is supported by message oriented middleware (MOM). The data distribution service for real-time systems (DDS) is, for example, a specification of a MOM operating on the publication/subscription model offering real-time guarantees on a local area network LAN. Such middleware provides a shared and omnipresent communication channel in modern information systems which allows numerous heterogeneous applications to integrate with one another and to exchange messages.

In the peer-to-peer (P2P) domain allowing several computers to communicate via a network and to share objects simply, numerous approaches have been proposed for distributing data while unburdening the content servers. An exemplary protocol known from the prior art allows an entity (called a seed) to share a content with a large number while reducing the impact in terms of bandwidth and processor use on itself. Users desiring to recover the content are called peers. Each peer, having recovered a part of the content, places it immediately at the disposal of the others.

In the type of network considered in this document, the topology changes regularly as dictated by the encounters between the mobile entities, and/or between the mobile entities and the scaffold of the network. The difficulty for the traditional implementations of the publication/subscription model is therefore to construct and to maintain the indices making it possible to put editors and subscribers in touch, and then to distribute the content from one point to another by passing the messages from one mobile entity to another as dictated by mobility.

For content routing in a network consisting solely of mobile entities, much work has been conducted in the field of networks tolerant to delays (DTN, Delay/Disruption Tolerant Networks). In DTNs, the nodes are mobile and encounter one another in an opportunistic or predictable manner. The number of neighbor nodes (with which a node is in contact) at each instant is fairly low and the connectivity graph is permanently partitioned. The probability of having an end-to-end path between a pair of nodes at a given instant is therefore very low (or indeed zero) when they are not in range of one another. It not being possible for the forwarding of the data packets to be done with the conventional IP routing mechanisms (e.g. Internet) in DTN networks, it may be based on the following principle: storage and transmission (known as "Store and Forward"). For example, the messages may be routed with an epidemic routing in which the messages propagate in an epidemic manner in the network. According to another type of routing of "Spray and Wait" type, the source node decides to transmit the message to N nodes that it encounters. Other known procedures of the prior art consider the historical log of the contacts which is used to determine whether or not it is opportune to retransmit a message.

It is also known to use a distributed algorithm making it possible to construct communities of users having similar mobility. The most central node of a community is elected broker so as to support disseminations of data of publication/subscription type within these communities.

In the publication by Stratis Ioannidis, Augustin Chaintreau and Laurent Massoulie, entitled "Optimal and Scalable Distribution of Content Updates over a Mobile Social Network", Proc of INFOCOM 2009, Rio de Janeiro, Brazil, the authors study the dissemination of content flows (e.g., RSS streams) from a server in the infrastructure to mobile users in the hybrid networks supporting the epidemic dissemination of the content by using the ad hoc communication capabilities. The authors propose a procedure allowing the content provider to allocate mobile users a certain bandwidth on the infrastructure access network such that the global freshness of the content is a maximum, while being equitable in relation to the quantity of content received by the users. In this publication, the allocation of the resources on the infrastructure network is performed in a static and global manner by considering a unique source of contents. No control loop is used to reallocate the resources as a function of the actual performance observed.

Despite all the advantages that they exhibit, the known procedures of the prior art do not make it possible to tune the dissemination of the data over time as a function of the progress in this dissemination so as to comply with the required timescales, within which timescales the information must be delivered to a user.

SUMMARY

The subject of the present invention relates to a method for disseminating messages Mi or information content in a so-called hybrid network comprising a network scaffold comprising pilot entities, a pilot entity comprising at least one database of content or of messages to be disseminated, a module for scheduling the transfers of the messages, a brokerage module, a module for measuring the state of dissemination of the messages Mi and a mobile network composed of N mobile nodes i, said mobile nodes communicating in an "ad hoc" manner with one another when they are in radio range, said infrastructure communicating with the mobile entities i of the mobile network, characterized in that it comprises at least the following steps:

At the level of each of the pilot entities of the scaffold of the network, execute an algorithm for scheduling the transfers of at least one message Mi by executing the following steps:
Let $S_C(t)$ be the set of mobile nodes that have subscribed to the content of type C.
Let Mi be a message corresponding to the content of type C,
For each message Mi contained in the database, if a mobile node i is present in the neighborhood of a pilot entity, then if i is subscribed to the content of type Mi, transfer the message Mi to the mobile user i,
Let $I_{Mi}(t)$ be the number of nodes that have received a message Mi containing information in the network at the instant t
Let STATE be the general state of the process for disseminating the message Mi, STATE taking an initial value "INPROGRESS".
While STATE="INPROGRESS", execute the following steps every $\Delta T$ seconds:
Recover from the module for measuring states of the dissemination the states $I_{Mi}(t)$ indicating at the current instant t the mobile nodes or entities of the mobile network that have received the message Mi,
Recover from the brokerage module the set $S_C(t)$ of mobile users subscribed to the content of type Type C
If cardinal $I_{Mi}(t)\rightarrow$cardinal $S_C(t)$.
Put STATE="STOP"
ELSE
Calculate Texp(Mi), the time remaining before expiry of Mi,
If Texp(Mi)>0, that is to say some time remains before the content of the message Mi becomes obsolete,
Call the function "Dissemination(Mi,$I_{Mi}$,$S_C$)" which will make it possible to disseminate or transmit the message Mi to all the entities which have subscribed to the content of type C.
Else
Remove Mi from the database, the content of the message Mi (information) has become obsolete.
The process managing the encounters between two mobile nodes i follows, for example, a Poisson law of intensity A and the dissemination function comprises at least the following steps:
the probability that a node or mobile entity i that has not yet received the message receives it is given by:

$$Pr[I(t+dt)-I(t)=1]=\lambda I(t)[N-I(t)]dt+o(dt)$$

$$Pr[I(t+dt)-I(t)>1]\rightarrow o(dt)$$

determine the state I(t) of the propagation or distribution of a message Mi
estimate at this instant t the probability $Pr[I(t+\Delta t)=N|(t)]$ that all the mobile nodes or entities i that have subscribed to the distribution service for the message Mi have received the message or information content, if an additional time $\Delta t$ is waited.
By fixing: a threshold value $\sigma$, a timescale D (equal to Exp (Mi)) for broadcasting a message Mi to the set of nodes of the network, execute the following algorithm:
estimate m the smallest number of mobile nodes which must initially receive the message Mi so that $Pr(I(D)\rightarrow N|I(0)\rightarrow m)\geq\sigma$ and do
at each call of the algorithm:
If $Pr(I(D)\rightarrow N|I(t)=i)\geq\sigma$ then modify nothing
Else, the probability of being able to disseminate the message Mi by virtue of the m initial nodes is low, then seek the smallest number k of nodes allowing the broadcasting of the message Mi to all the entities that have subscribed to the transmission service for Mi, as long as
$Pr(I(D)\rightarrow N|I(t)=i+k)\geq S$, and add k mobile nodes to the set, the k added nodes being chosen at random.

According to one embodiment, each node i encounters another node j according to a Poisson process of intensity $\lambda ij$, Let $p_i(t)$ be the probability that node i is infected at the instant t, and $I(t)=(p_i(t))i$, the number of nodes that have received the message Mi
establish the following relation:

$$p_i(t+dt) = p_i(t) + (1-p_i(t))\left(1 - \prod_{j\neq i}(1-p_j(t)\lambda_{ij}dt + o(dt))\right)$$

-continued $$= p_i(t) + (1 - p_i(t))\left(\sum_{j \neq i} p_j(t)\lambda_{ij} dt\right) + o(dt)$$

knowing $I_{Mi}(t)$ (the state of the propagation of the message Mi at the instant t), fix the values of $p_i(t) \in \{0, 1\}$ depending on whether the node 101$i$ has or has not received the message Mi, estimate the $p_i(t+\Delta t | I(t))$, knowing I(t), calculate the probability of success of the broadcasting of the message Mi to all the mobile nodes i at the instant t+$\Delta$t, $$Pr_{succ}(t+\Delta t | I(t)) \rightarrow \Pi p_i(t+\Delta t | I(t))$$

In order for the probability that a node or mobile entity receives the message Mi within the lifetime of the message $Pr_{succ}(D) \geq \sigma$ to be permanently greater than or equal to a threshold value $\sigma$ repeat the following algorithm every $\Delta T$ seconds 0:

$I_{Mi\_old}(t)=I_{Mi}(t)$ corresponds to the set of nodes which have received the message Mi.

While $S_C(t) \neq I_{Mi}(t)$ and $Pr_{succ}(D|I_{Mi}(t))<\sigma$,

For each node or mobile entity s belonging to the set of nodes which has adhered or subscribed to the content C but which has not yet received the message, recalculate the value of the probability $Pr_{succ}(D|I_{Mi}(t))$ by assuming that s is infected Let $s_{max}$ be the node which, when it has received the message Mi, causes the greatest increase in the value of the probability $Pr_{succ}(D|I_{Mi}(t))$, Add $s_{max}$ to the set of infected nodes by doing $I_{Mi}(t) \rightarrow I_{Mi}(t) \cup \{s_{max}\}$ And then broadcast the content or the message Mi to the nodes belonging to the set $I_{Mi}(t) \setminus I_{Mi\_old}(t)$, that is to say the new set excluding the old set.

The estimation of the probabilities $p_i(t+\Delta t | I(t))$ is carried out, for example, by solving the system $$\frac{dp_i(t)}{dt} = (1 - p_i(t))\left(\sum_{j \neq i} p_j(t)\lambda_{ij}\right)$$

in an approximate manner.

The invention also relates to a system making it possible to disseminate an information content or message Mi within a network comprising one or more pilot entities communicating with one or more mobile nodes or users 101$i$ communicating with at least one of the pilot entities, characterized in that:

at least one pilot entity comprises at least the following elements:

a Database of messages Mi to be distributed to the mobile entities or nodes that have subscribed that have subscribed to this type of content a brokerage module maintaining the list of mobile entities that are subscribed to a certain type of content, a Module for ascertaining and learning the mobility of said mobile entities, a module for measuring the state of the disseminations of the messages Mi referenced in the database, a routing module, a module for scheduling the transfers making it possible to decide which message or messages are the ones that must be transferred at a given instant and to which mobile entity(entities) via the infrastructure network and executing the steps of the scheduling algorithm described hereinabove, by using the information provided by the database, by the brokerage module, by the module for measuring the state of the disseminations, by the routing module, and by a module for learning the mobility, a mobile entity of the mobile network comprising at least the following elements:

a database of messages Mi received, a brokerage module allowing a mobile entity to register with a service, a module for scheduling the transfers which makes it possible to decide which message(s) must be transferred and to which mobile entity(entities).

BRIEF DESCRIPTION OF THE DRAWINGS

Other characteristics and advantages of the device according to the invention will be more apparent on reading the description which follows of an exemplary embodiment given by way of wholly nonlimiting illustration together with the figures which represent.

DETAILED DESCRIPTION

In order to better elucidate the subject matter of the present invention, the example which follows is given within the framework of a network comprising an infrastructure (with its access network) as well as fixed and mobile users. The mobile users 101$i$ are for example in a 3G context of portable telephones. The infrastructure corresponds, for example, to the network of a mobile telephone operator and comprises fixed editors which are for example content servers hosted in the core of the Internet or in a core network of the 3G access provider. In this example, it is considered that the content editors are also the "pilots" of the broadcasting thereof.

Without departing from the scope of the invention, it would be possible to use a mobile user as content source and/or as "pilot" of the broadcasting thereof.

Figure 1A:
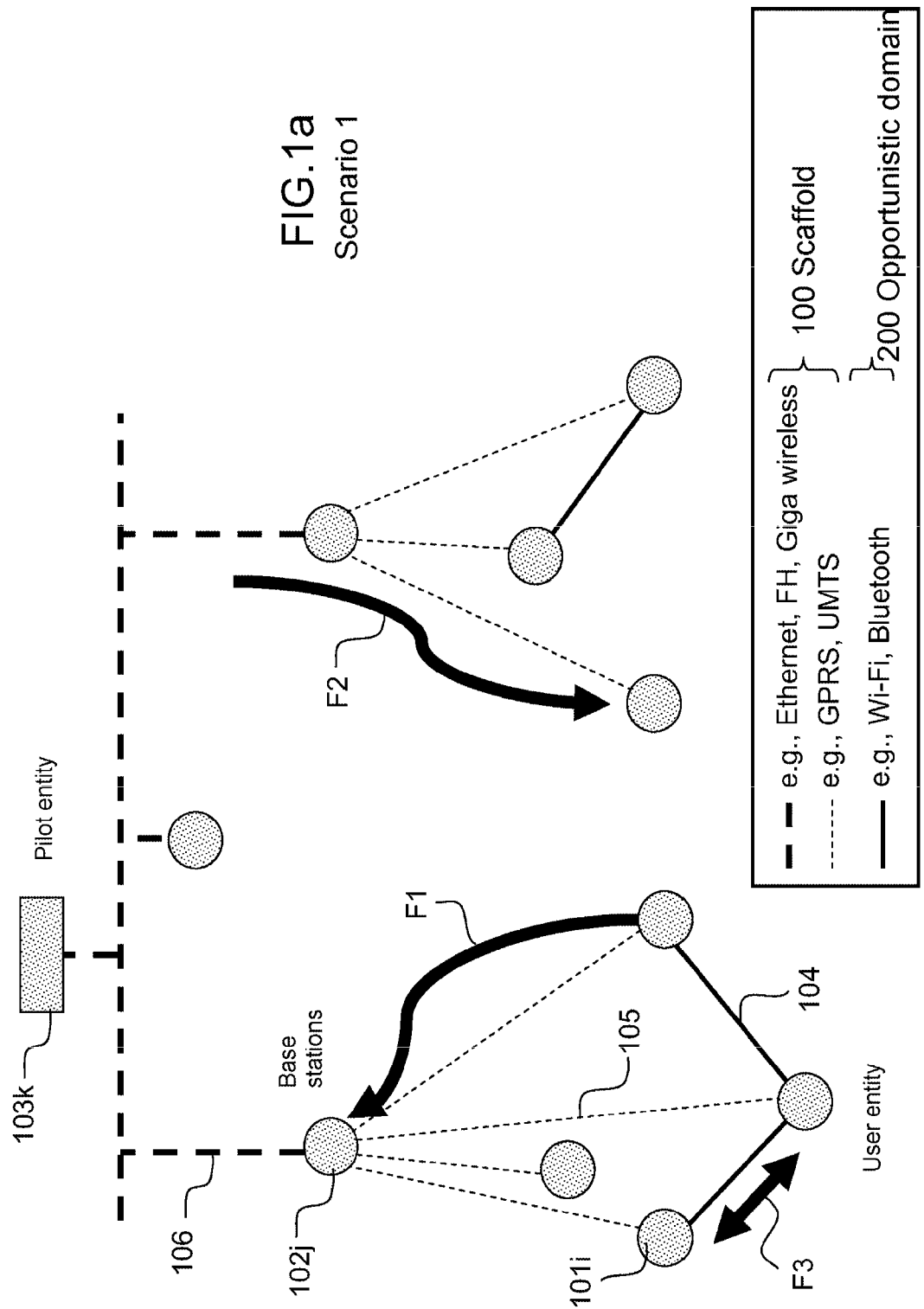
FIG. 1$a$, a first exemplary hybrid network in which the method according to the invention may be implemented, and FIG. 1$b$, a second example, FIG. 2, in a schematic manner the loop for transmitting the information content according to the invention, FIG. 3, the elementary functions present in a "pilot", and FIG. 4, the list of the elementary functions present in a mobile user of the hybrid communication network.
Figure 2:
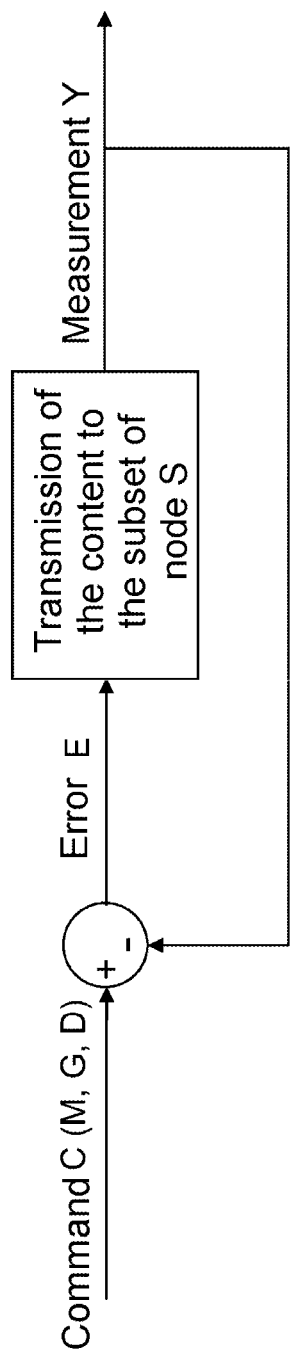

The method uses notably a control loop, shown diagrammatically for example in FIG. 2, to disseminate in a massive manner the data or information content from fixed editors in the scaffold of the network to the mobile users who have subscribed to said content, while complying with the associated maximum delivery timescales.

In FIG. 2 is represented a loop comprising a command C ordering the delivery of a data content Mi to a group G of mobile users 101$i$ within a maximum timescale D corresponding to a timescale fixed as a function of the information to be transmitted. In an iterative manner, as a function of the observation of the distribution or deliveries of the content already performed at the level of the mobile users, this corresponding to the measurement Y in FIG. 2, the method according to the invention determines the error E relating to the command C, so as to decide which subset of mobile subscribers who have not yet received the information and who ought to receive it must receive the information content via the scaffold of the network, so as to comply with the timescale constraint associated with Mi (information content). In the previous example, the content to be transmitted was the content of the newspaper the New York Times, with a timescale of one day, for example, it being possible for the daily information to be considered to be out of date by the following day.

Figure 3:
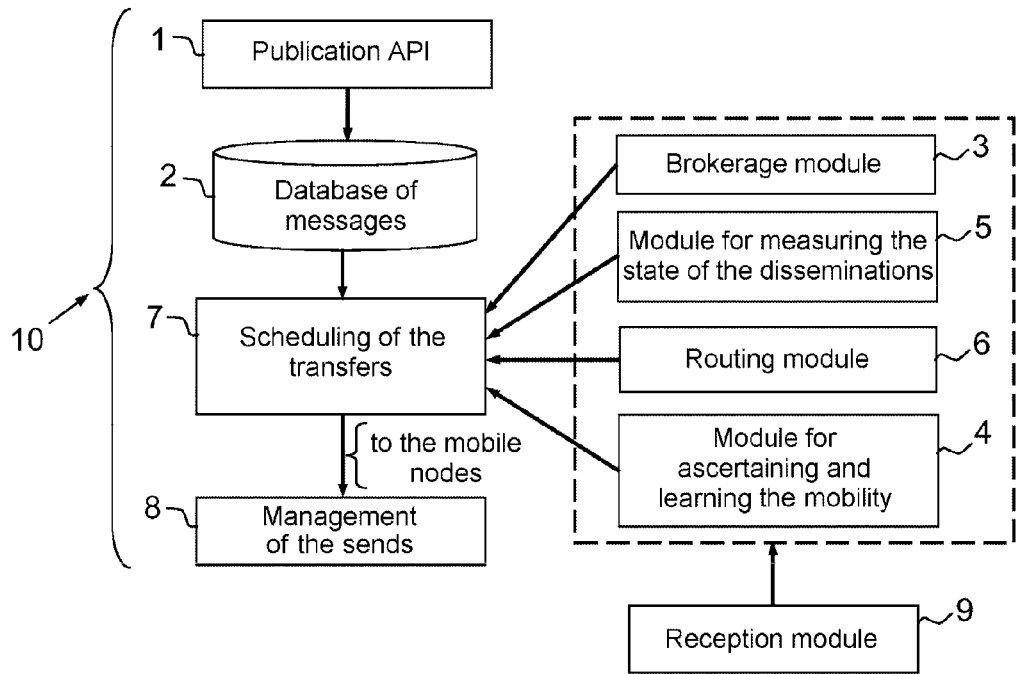

FIG. 3 illustrates the various elements and modules (referenced 10 in the figure) which have to be present in each of the "pilot" entities that control the broadcasting of the contents.

Publication API 1: This interface is used by the content providers to publish a content. This interface makes it possible to specify the service quality parameters (QoS, Quality of Service) associated with the dissemination (e.g. the message Mi is no longer relevant after the instant T). In order to characterize the published content, numerous techniques may be used, such as for example the use of metadata or of topics (for example /news/basketball/europe/championship for the information relating to the results of the European basketball championship). This API makes it possible to pass the message (e.g., whole or sub-part of a content) to the database 2 of messages Mi.

Database 2 of messages: The "pilot" entities of the network using the method are furnished with a memory or a database allowing them to store the messages Mi to be distributed to the users that have subscribed to a given service allowing them to obtain in a given timescale the content of the messages Mi. The messages Mi that have expired are automatically erased from this database, that is to say the messages have a lifetime or expiry timescale, timescale on the basis of which the information no longer has any instantaneous value for a user. They will therefore be eliminated from this database as soon as the value of the instant at which the user receives them is greater than the expiry timescale.

Brokerage module 3: This module makes it possible to maintain the list of the users subscribed to a certain content, characterized as indicated previously (e.g., by using for example metadata or topics).

Module 4 for ascertaining and learning the mobility: This module ascertains a priori or gathers information relating to the mobility (past or future) of the mobile nodes (this information may be gathered by using a GSM Global System Mobile cell, or else GPS Global Positioning System data) or relating to their interactions (e.g. frequency of the contacts between two given mobile entities, planning of the mobility of a user). This information allows the module 7 for scheduling the transfers to globally optimize the distribution of the information content (messages Mi to be distributed in a given timescale to a user who has subscribed).

Module 5 for measuring the state of the disseminations: This module measures the state of the dissemination of the messages Mi referenced in the database 2 of the messages by receiving mainly notifications of delivery from the users via the scaffold of the network. It harvests the information on the delivery or non-delivery of the information content awaited by a client. This information which ascends from the mobile entities to the source of the content allows the implementation of the return channel proposed in this method. The module can if necessary also request this information directly from the users.

Routing module 6: This module makes it possible to ascertain the best route or the various possible routes for reaching a given user. It is this route or path by which the messages Mi will be transmitted. The users may be reachable in a synchronous manner via the scaffold of the network, for example an IP path (Internet Protocol exists), this information is then given by an IP routing protocol and address resolution mechanisms (e.g. DNS, procedure or protocol which offers a device of the network such as a router the capability of using the "Internet Protocol Suite" protocol). The users may also be reachable in an asynchronous manner by using opportunistic forwarding; this information is then given by a DTN routing protocol known to the person skilled in the art and the function of which is notably to change, in real-time, configurations of names of domains, of addresses or of still other information.

Scheduling 7 of the transfers: This module makes it possible to decide which message or messages are the ones that must be transferred at a given instant and to which mobile entity(entities) via the scaffold of the network. This decision is taken by using the information provided by the database 2 of the messages Mi, by the brokerage module 3, by the module of the state of the disseminations 5, by the routing module 6, as well as by the module for learning the mobility 4. The scheduling algorithm used by the method according to the invention is explained hereinafter in the document.

Management 8 of the sends: This module performs the sending of the messages from the module 7 for scheduling the transfers to the mobile users 101i that have subscribed to a service.

The scheduling algorithm may be implemented in software form in an application package routing stack or overlay.

Figure 4:
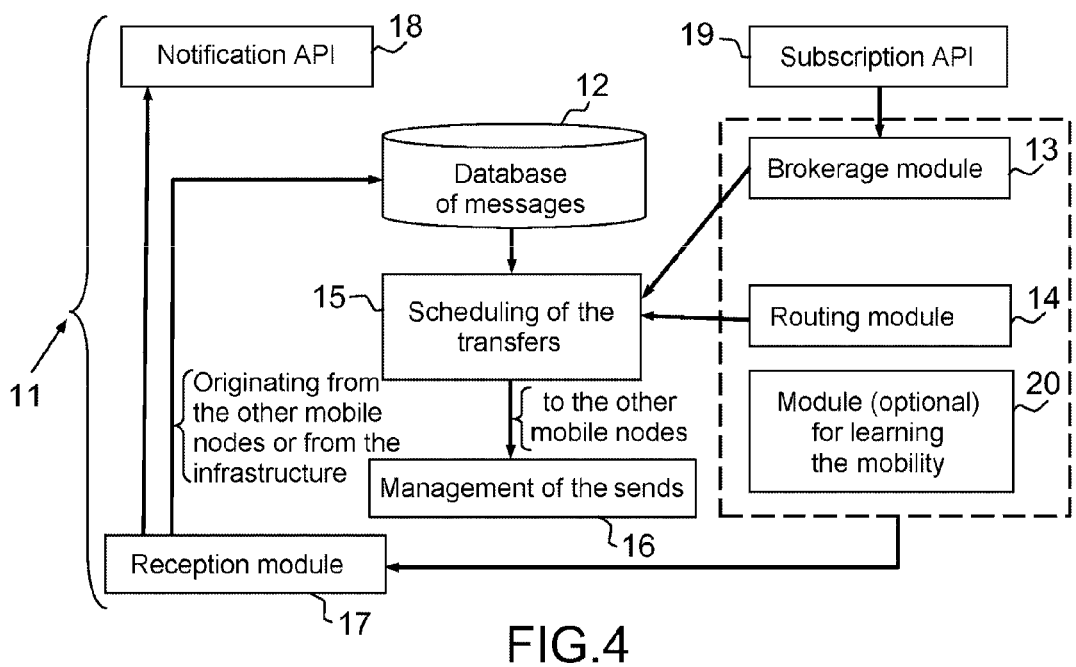

FIG. 4 illustrates for its part the various modules and elements (reference 11) present in a mobile user 101i of the mobile network.

Database 12 of messages: The mobile users of the network are furnished with a memory allowing them to store the messages Mi that they have received in transit to be redistributed. The messages whose delivery timescale is in the past are automatically erased from this database. Such messages will be said to have expired.

Brokerage module 13: This module allows the mobile user to register via the subscription API 19 as subscriber in respect of a certain data content characterized as indicated previously (by using for example metadata or topics). This module retains a local knowledge of the subscriptions of the node. The updates are transmitted to the "pilots" of the contents via the scaffold of the network.

Routing module 14: This module makes it possible to ascertain the route for reaching entities via the scaffold but especially to discover the nodes in proximity to another node by using the ad hoc communication capabilities of the mobile network for example.

Scheduling of the transfers 15: This module makes it possible to decide which message(s) must be transferred and to which entity(entities). This decision is taken by using the information provided by the database 12 of messages, by the brokerage module 13, and by the routing module 16. The algorithm used is described hereinafter in the document.

Management of the sends 16: This module performs the transfers of the messages Mi from the module for scheduling the transfers 15 to the mobile entities 101i in radio range.

Reception module 17: This module receives the messages originating from the other entities and then stores them in the database of messages 12 if the latter have not expired, that is to say the message having a given lifetime, the latter has not lapsed. This module decides to transfer each message Mi received to the notification API 10 if the entity hosting the module is a subscriber for messages of this type, this information is given by the brokerage module 13.

Notification API 18: This interface notifies the local applications that have subscribed to a content of the arrival of a message Mi corresponding to this type of content.

Subscription API 19: This interface allows the local applications to subscribe to a certain type of content.

Module 20 (Optional) for learning the mobility: This module gathers information relating to the mobility (past or future) of the mobile node (e.g, GSM cell, GPS data) or relating to its interactions with the others (e.g, frequency of the contacts between two given mobile entities). This information is transmitted periodically to the "pilot" entities via the scaffold of the network.

Algorithm of the Module 7 for Scheduling the Transfers

The algorithm may be implemented in software form in an application package "routing" stack situated in the module 7 of an entity of the scaffold.

A network of nodes or mobile entities is considered.

Let $S_C(t)$ be the set of nodes that have subscribed to the content C.

Let Mi be a message corresponding to the content C.

Let $I_{Mi}(t)$ be the number of infected nodes, that is to say that have received the message Mi at the instant t. $I_{Mi}(t)$ is included in $S_C(t)$.

The following algorithm allows the module 7 for scheduling the transfers residing on the entities of the scaffold to undertake the dissemination of a message Mi belonging to the content C:

Let STATE be the general state of the process for disseminating the message Mi. STATE taking, for example, as initial value "INPROGRESS".

While STATE="INPROGRESS", execute the following steps every ΔT seconds:

Recover from the module for measuring states of the dissemination 5 the states $I_{Mi}(t)$ indicating at the current instant f the mobile nodes or entities of the mobile network that have received the message Mi.

Recover from the brokerage module 3 the set $S_C(t)$ of the mobile users who are subscribed to the content of type Type C.

If cardinal $I_{Mi}(t) \rightarrow$ cardinal $S_C(t)$
  Put STATE="STOP"
ELSE
  Calculate Texp(Mi), the time remaining before expiry of Mi,
  If Texp(Mi)>0, that is to say some time remains before the content of the message Mi becomes obsolete,
    Call a function dubbed "Dissemination(Mi,$I_{Mi}$, $S_C$)" which will make it possible to disseminate or transmit the message Mi to all the entities which have subscribed to the content C.
  Else
    Remove Mi from the database 2, the content of the message Mi (information) has become obsolete.

The value of ΔT is chosen to be less than the initial expiry time of the content. The smaller it is, then it is possible to control the dissemination of the content and the accuracy of this dissemination. If it is too small, the system is at risk of reacting poorly in the presence of prediction errors as regards the mobility of the nodes.

The following algorithm allows the module for scheduling the transfers 7 residing on the mobile users to operate:

For each message Mi present in the database 2,
  If a mobile user 101i is present in the neighborhood,
    If 101i is subscribed to the content of type(Mi),
      Transfer the message Mi to the mobile user 101i
"Dissemination (Mi, $I_{Mi}$,$S_c$)" Function One seeks to ensure the broadcasting of the message Mi to the set $S_c$ of subscribers of the content C in the timescale allowed, knowing that the nodes in $I_{Mi}$ already have the message.

One considers the network consisting of the N nodes that have subscribed to the content C at the instant t. N=cardinal $(S_c(t))$ Two ways of implementing the algorithm will be explained.

Homogeneous Case

The first case assumes that a node or mobile entity encounters another node according to one and the same process of inter-arrival of the contacts according to a Poisson law of intensity λ.

As all the nodes are interchangeable, it suffices in this first exemplary implementation to ascertain the number of infected nodes i(t)=cardinal($I_{Mi}(t)$), so as to characterize the state of the propagation of the epidemic or dissemination of the content or of a message. i(t) has values in {1, 2, ..., N}.

i(t) evolves according to a non-homogeneous Poisson process. Indeed, when i(t) nodes are infected, that is to say they have received the message Mi, and N−i(t) are healthy, this corresponding to mobile entities which have not yet received the message Mi, there is a number equal to i(t)[N−i(t)] possibilities of encounters between the mobile nodes 101i which can add a node to the set $I_{Mi}(t)$ of nodes that have received the message Mi.

Which leads to the probability that a node or mobile entity that has not yet received the message receives it:

$Pr[i(t+dt)-i(t)=1]=\lambda i(t)[N-i(t)]dt+o(dt)$ $Pr[i(t+dt)-i(t)>1]=o(dt)$ o(t) is a conventional mathematical notation within the framework of a finite expansion. These mathematical expressions make it possible to explain the theoretical elements underlying the implementation of the method described in the paragraph relating to the dissemination with feedback algorithm.

The succession of the infection states (a state indicates at a current instant t the number of mobile nodes having a message Mi) forms a continuous-time Markov chain. The intensity of transition between the state i(t)=k state for which k mobile nodes have received the message Mi and i/(t+dt)→k+1, state for which (k+1) nodes have received the message Mi is: $\lambda k = \lambda k(N-k)$. This corresponding to the following transition matrix:

$$Q = \begin{bmatrix} -\lambda_1 & \lambda_1 & & & 0 \\ & -\lambda_2 & \lambda_2 & & \\ & & \ddots & \ddots & \\ & & & -\lambda_{N-1} & \lambda_{N-1} \\ 0 & & & & 1 \end{bmatrix}$$

Let π(t) be the state vector of this Markov chain:

$\pi(t+dt)=\pi(t)(I_N+Q_{dt}+o(dt))$

This giving the vector $\pi(t+\Delta t)=\pi(t)e^{Q\Delta t}$.

After a time Δt, there will on average be $E(i(t+\Delta t))=[1\ 2\ ...\ N]\cdot\pi(t+\Delta t)$ infected nodes, that is to say that will have received a message Mi.

Broadcasting with Feedback Algorithm

A measurement of the state of the propagation or distribution of a message provides the state $I_{Mi}(t)$ (and therefore the value of i(t) and of the vector π(t) with 0s everywhere except for the current state which equals 1. It is then possible to estimate at this instant the probability $Pr[i(t+\Delta t)=N|i(t)]$ that all the nodes or mobile entities that have subscribed to the distribution service for the message Mi have received the message or information content, if an additional time Δt is waited.

By fixing:
a threshold σ (e.g. 95%)
a timescale D (equal to Exp(Mi)) for broadcasting a message Mi to the entire set of nodes of the network At the first call of the broadcasting with feedback algorithm, the smallest number m of mobile nodes which must initially receive the message Mi so that $Pr(i(D)=N|i(t)\rightarrow m) \geq \sigma$, is estimated (probability that the propagation threshold is sufficient/whole of the period, D is the value of the deadline); m corresponds to the number of mobile nodes that have initially received the message Mi.

At each call of the algorithm:
If $Pr(i(D)=N|i(t)=n) \geq \sigma$ then nothing is done, the probability of disseminating the message Mi, with the aid of the n nodes infected at the instant t, is satisfactory.

Else, the probability of being able to disseminate the message Mi by virtue of the n nodes currently infected is too low. We then seek the smallest number k of additional nodes allowing the broadcasting of the message Mi to all the entities that have subscribed to the content C with a satisfactory probability. We therefore seek the smallest k such that: $Pr(i(D)=N|i(t)=n+k) \geq \sigma$. Finally, we choose at random k uninfected nodes to each of which a copy of the message Mi is distributed by passing through the infrastructure.

Non-Homogeneous Case

Estimation of the Probability of Success of the Broadcast

Each node i encounters another node j according to a Poisson process of intensity λij, thus leading to λij=λji and λii=0.

Let $p_i(t)$ be the probability that node i is infected at the instant t, and the string $(p_i(t))_i$ characterizes our knowledge of the propagation of the epidemic. The following relation is established:

$$p_i(t+dt) = p_i(t) + (1-p_i(t))\left(1 - \prod_{j \neq i}(1 - p_j(t)\lambda_{ij}dt + o(dt))\right)$$
$$= p_i(t) + (1-p_i(t))\left(\sum_{j \neq i} p_j(t)\lambda_{ij}dt\right) + o(dt)$$

This giving the following system of differential equations:

$$\frac{dp_i(t)}{dt} = (1-p_i(t))\left(\sum_{j \neq i} p_j(t)\lambda_{ij}\right)$$

Knowing $I_{Mi}(t)$, the values of $p_i(t) \in \{0,1\}$ are fixed depending on whether the mobile node 101i is or is not infected. It is then possible to estimate the $p_i(t+\Delta t | I_{Mi}(t))$ by solving the system in an approximate manner (using, for example, the RK4 Runge-Kutta procedure [RK4 known to the person skilled in the art]).

Finally, knowing I(t), it is possible to calculate the probability of success of the broadcasting of a message Mi to all the nodes at the instant t+Δt.

$$Pr_{succ}(t+\Delta t | I_{Mi}(t)) = \Pi p_i(t+\Delta t | I_{Mi}(t))$$

this corresponding to the probability that nodes receive the message Mi to be broadcast. The notation $\Delta t \oplus I_{Mi}(t)$ corresponds to the Probability that at t+Δt knowing that $I_{Mi}(t)$ are already infected, all the nodes are infected.

Greedy Feedback Algorithm for Controlling Broadcasting in the Non-Homogeneous Case Initially, the set of mobile nodes that have received the message Mi, $I_{Mi}(t=0)$, is the empty set.

As in the simplified model, we fix for example:
a threshold σ (e.g. 95%)
a timescale D (equal to Exp(Mi)) for broadcasting a message Mi to the entire set of nodes of the network We wish to permanently ensure that $Pr_{succ}(D) \geq \sigma$. That is to say that permanently, we wish the probability that a node or mobile entity receives the message Mi within the lifetime of the message to be greater than a threshold value. This threshold value is chosen as a function of the information contained in the message Mi. It is an input datum for the dissemination process; it is the tolerance to the fact that a certain number of nodes are not infected at the end.

Accordingly, we shall use the following greedy algorithm (repeated every ΔT seconds):

$I_{Mi\_old}(t) := I_{Mi}(t)$ corresponds to the set of nodes which have received the message *Mi*.

While $S_C(t) \neq I_{Mi}(t)$ and $Pr_{succ}(D|I_{Mi}(t)) < \sigma$, as long as all the users have not received the message Mi and the probability that a node or mobile entity receives the message Mi within the lifetime of the message is less than a threshold value σ

For each node or mobile entity s belonging to the set of nodes which has adhered or subscribed to the content C but which has not yet received the message, recalculate the value of the probability $Pr_{succ}(D|I_{Mi}(t))$ by assuming that s is infected Let $s_{max}$ be the node which, when it has received the message Mi, causes the greatest increase in the value of the probability $Pr_{succ}(D|I_{Mi}(t))$, Add $s_{max}$ to the set of infected nodes by doing $I_{Mi}(t) = I_{Mi}(t) \cup \{s_{max}\}$ Next, broadcast the content or the message M/to the nodes belonging to the set $I_{Mi}(t) \setminus I_{Mi\_old}(t)$, that is to say the new set excluding the old set.

ADVANTAGES

The method uses information relating to the interactions between the nodes (for example the mobility of the nodes, the frequency of their encounters) so as to minimize the number of mobile nodes which receive the content from the service for distributing the content via the scaffold of the network (3G or VHF for example) while guaranteeing a maximum delivery timescale.

This method makes it possible notably to reduce radio communications by minimizing the information exchanged between the scaffold of the network and the mobile nodes. This presents benefits notably in terms of discretion, increase in the lifetime of the network, reduction in costs and gain in global capacity of the network.

The method according to the invention is robust to prediction errors related to the fact that the mobility of the nodes is not usually deterministic. The closed control loop allows regular retuning of the process so that it satisfies the expected result in all cases.

The invention claimed is:

1. A method for disseminating messages Mi or information content in a so-called hybrid network comprising one or more pilot entities, a pilot entity comprising at least one database of messages to be disseminated, a module for scheduling the transfers of the messages, a brokerage module, a module for measuring the state of dissemination of the messages Mi and a mobile network composed of N mobile user nodes or Ui, said mobile nodes communicating with one another when they are in radio range, said pilot entities communicating with the mobile user entities of the mobile network, the method comprising:

at the level of each of the pilot entities of the network, execute an algorithm for scheduling the transfers of at least one message Mi by executing the following steps:

Let $S_C(t)$ be the set of mobile nodes that have subscribed to the content of type C, Let Mi be a message corresponding to the content of type C, For each message Mi contained in the database, if a mobile user node is present in the neighborhood of a pilot entity, then if the mobile user entity is subscribed to the content of type Mi, transfer the message Mi to said mobile user, Let $I_{Mi}(t)$ be the number of nodes that have received a message Mi containing information in the network at the instant t:

Let STATE be the general state of the process for disseminating the message Mi, STATE taking an initial value "INPROGRESS", While STATE="INPROGRESS", execute the following steps every ΔT seconds:

Recover from the module for measuring states of the dissemination (5) the states $I_{Mi}(t)$ indicating at the current instant t the mobile nodes or entities of the mobile network that have received the message Mi, Recover from the brokerage module (3) the set $S_C(t)$ of mobile users subscribed to the content of type Type C, If cardinal $I_{Mi}(t)$=cardinal $S_C(t)$ Put STATE="STOP"

ELSE

Calculate Texp(Mi), the time remaining before expiry of Mi

If Texp(Mi)>0, that is to say some time remains before the content of the message Mi becomes obsolete, Call a function "Dissemination(Mi,$I_{Mi}$,$S_C$)" which will make it possible to disseminate or transmit the message Mi to all the entities which have subscribed to the content of type C, Else Remove Mi from the database (2), the content of the message Mi (information) has become obsolete.

2. The method as claimed in claim 1, wherein the process managing the encounters between two mobile user nodes follows a Poisson law of intensity and the dissemination function comprises:

the probability that a node or mobile user entity that has not yet received the message receives it is given by:

$$Pr[I(t+dt)-I(t)=1]=\lambda I(t)[N-1(t)]dt+o(dt)$$

$$Pr[I(t+dt)-I(t)>1]=o(dt)$$

determine the state $I(t)$ of the propagation or distribution of a message Mi, estimate at this instant t the probability $Pr[I(t+\Delta t)=N|I(t)]$ that all the mobile user nodes or entities that have subscribed to the distribution service for the message Mi have received the message or information content, if an additional time Δt is waited, by fixing: a threshold value σ, a timescale D (equal to Exp(Mi)) for broadcasting a message Mi to the set of nodes of the network, execute the following algorithm:

estimate m the smallest number of mobile nodes which must initially receive the message Mi so that $Pr(I(D)=N|I(0)=m)\geq\sigma$ and do at each call of the algorithm:

If $Pr(I(D)=N|I(t)=i)\geq\sigma$ then modify nothing else, the probability of being able to disseminate the message Mi by virtue of the m initial nodes is low, then seek the smallest number k of nodes allowing the broadcasting of the message Mi to all the entities that have subscribed to the transmission service for Mi, as long as $Pr(I(D)=N|I(t)=i+k)\geq S$, and add k mobile nodes to the set, the k added nodes being chosen at random.

3. The method as claimed in claim 1, wherein for a network where each node i encounters another node j according to a Poisson process of intensity λij, let $p_i(t)$ be the probability that node i is infected at the instant t, and $I(t)=(p_i(t))i$, the number of nodes that have received the message Mi establish the following relation:

$$p_i(t+dt) = p_i(t) + (1-p_i(t))\left(1 - \prod_{j\neq i}(1-p_j(t)\lambda_{ij}dt + o(dt))\right)$$
$$= p_i(t) + (1-p_i(t))\left(\sum_{j\neq i}p_j(t)\lambda_{ij}dt\right) + o(dt)$$

knowing $I_{Mi}(t)$ (the state of the propagation of the message Mi at the instant t), fix the values of $p_i(t)\in\{0, 1\}$ depending on whether the node has or has not received the message Mi, estimate the $p_i(t+\Delta t|I(t))$, knowing I(t), calculate the probability of success of the broadcasting of the message Mi to all the mobile user nodes at the instant t+Δt, $$Pr_{succ}(t+\Delta t|I(t))=\Pi p_i(t+\Delta t|I(t))$$

In order for the probability that a node or mobile entity receives the message Mi within the lifetime of the message $Pr_{succ}(D)\geq\sigma$ to be permanently greater than or equal to a threshold value σ repeat the following algorithm every ΔT seconds:

$I_{Mi\_old}(t):=I_{Mi}(t)$ corresponds to the set of nodes which have received the message Mi, while $S_C(t)\neq I_{Mi}(t)$ and $Pr_{succ}(D|I_{Mi}(t))\leq\sigma$;

for each node or mobile entity s belonging to the set of nodes which has adhered or subscribed to the content C but which has not yet received the message, recalculate the value of the probability $Pr_{succ}(D|I_{Mi}(t))$ by assuming that s is infected let $s_{max}$ be the node which, when it has received the message Mi, causes the greatest increase in the value of the probability $Pr_{succ}(D|I_{Mi}(t))$, add $s_{max}$ to the set of infected nodes by doing $I_{Mi}(t)=I_{Mi}(t)\cup\{s_{max}\}$ and then broadcast the content or the message Mi to the nodes belonging to the set $I_{Mi\_old}(t)$, that is to say the new set excluding the old set.

4. The method as claimed in claim 3, wherein the estimation of the probabilities $p_i(t+\Delta t|I(t))$ is carried out by solving the system $$\frac{dp_i(t)}{dt} = (1-p_i(t))\left(\sum_{j\neq i}p_j(t)\lambda_{ij}\right)$$

in an approximate manner.

5. A system making it possible to disseminate an information content or message Mi within a network comprising one or more pilot entities communicating with one or more mobile nodes or users communicating with at least one of the pilot entities, wherein at least one pilot entity comprises:
- a Database of the messages Mi to be distributed to the mobile entities or nodes that have subscribed that have subscribed to this type of content
- a brokerage module maintaining the list of mobile user entities that are subscribed to a certain type of content,
- a Module for ascertaining and learning the mobility of said mobile entities,
- a module for measuring the state of the disseminations of the messages Mi referenced in the database,
- a routing module,
- a module for scheduling the transfers making it possible to decide which message or messages are the ones that must be transferred at a given instant and to which mobile entity(entities) via the infrastructure network and executing the steps of the scheduling algorithm as claimed in claim 1, by using the information provided by the database, by the brokerage module, by the module for measuring the state of the disseminations, by the routing module, and by a module for learning the mobility, a mobile user entity of the mobile network comprising at least the following elements:
- a database of the messages Mi received,
- a brokerage module allowing a mobile entity to register with a service,
- a module for scheduling the transfers which makes it possible to decide which message(s) must be transferred and to which mobile entity(entities).

6. The system as claimed in claim 5, wherein a user entity comprises a short-range but high-bitrate UHF (Ultra High Frequency) radio and/or a long-range but low-bitrate VHF (Very High Frequency) radio.

7. The system as claimed in claim 5, wherein a mobile entity communicates with a pilot entity via a base station, said communication between a user entity and a base station being performed via GPRS or UMTS links and a base station communicates with a pilot entity via Ethernet, FH or Giga Wireless links.

8. The system as claimed in claim 5, characterized in that a user entity communicates with a first base station, and then toward a base station by using VHF radio links.

* * * * *